(12) United States Patent
Hodgson et al.

(10) Patent No.: US 9,512,768 B2
(45) Date of Patent: Dec. 6, 2016

(54) DEVICE FOR SUPPLYING A LIQUID ADDITIVE AND MOTOR VEHICLE HAVING THE DEVICE

(71) Applicant: EMITEC GESELLSCHAFT FUER EMISSIONSTECHNOLOGIE MBH, Lohmar (DE)

(72) Inventors: Jan Hodgson, Troisdorf (DE); Sven Schepers, Troisdorf (DE); Rolf Brueck, Bergisch Gladbach (DE)

(73) Assignee: EMITEC Gesellschaft fuer Emissionstechnologie mbH, Lohmar (DE)

(*) Notice: Subject to any disclaimer, the term of this patent is extended or adjusted under 35 U.S.C. 154(b) by 63 days.

(21) Appl. No.: 14/518,090

(22) Filed: Oct. 20, 2014

(65) Prior Publication Data
US 2015/0033713 A1 Feb. 5, 2015

Related U.S. Application Data

(63) Continuation of application No. PCT/EP2013/056580, filed on Mar. 27, 2013.

(30) Foreign Application Priority Data

Apr. 19, 2012 (DE) .................. 10 2012 007 691

(51) Int. Cl.
*F01N 3/00* (2006.01)
*F01N 11/00* (2006.01)
(Continued)

(52) U.S. Cl.
CPC .............. *F01N 11/00* (2013.01); *F01N 3/208* (2013.01); *F01N 3/2066* (2013.01); *G01F 23/00* (2013.01);
(Continued)

(58) Field of Classification Search
CPC ...... F02D 41/029; F01N 9/002; F01N 3/0842; F01N 3/035; F01N 13/02
(Continued)

(56) References Cited

U.S. PATENT DOCUMENTS 5,586,085 A * 12/1996 Lichte ................. G01F 25/0061
367/165
8,248,888 B1 * 8/2012 Enzler ..................... G01S 7/521
367/99
(Continued)

FOREIGN PATENT DOCUMENTS

DE 10312102 A1 9/2004
DE 102004028547 A1 2/2006
(Continued)

*Primary Examiner* — Patrick Maines
(74) *Attorney, Agent, or Firm* — Laurence A. Greenberg; Werner H. Stemer; Ralph E. Locher

(57) ABSTRACT

A device for supplying a liquid additive for a motor vehicle includes a tank for storing the liquid additive and a delivery unit for delivering the liquid additive out of the tank. A sensor emits and receives waves and is configured to measure a fill level of the liquid additive in the tank by way of a propagation time measurement of the waves along a measurement path to a liquid surface in the tank and back to the sensor. The measurement path runs at least partially through a measurement duct. At least one back-flushing line ends in the measurement duct so that flushing of the measurement duct to the tank can be performed, in such a way that the measurement duct is kept clean and/or is cleaned. A motor vehicle having the device is also provided.

13 Claims, 3 Drawing Sheets

(51) Int. Cl.
*F01N 3/20* (2006.01)
*G01F 23/00* (2006.01)

(52) U.S. Cl.
CPC ........ *F01N 2560/12* (2013.01); *F01N 2610/01* (2013.01); *F01N 2610/02* (2013.01); *F01N 2610/1406* (2013.01); *F01N 2610/148* (2013.01); *F01N 2610/1493* (2013.01); *F01N 2900/1814* (2013.01); *Y02T 10/24* (2013.01)

(58) Field of Classification Search
USPC ......... 60/273, 274, 285, 286, 295, 297, 301; 73/304 R, 290 V
See application file for complete search history.

(56) References Cited

U.S. PATENT DOCUMENTS

| | | | |
|---|---|---|---|
| 9,127,583 B2 | 9/2015 | Hodgson et al. | |
| 2005/0150291 A1* | 7/2005 | Voss | G01F 23/2962 73/290 V |
| 2005/0284217 A1* | 12/2005 | Miyagawa | G01F 23/2962 73/290 V |
| 2009/0183564 A1* | 7/2009 | Kotz | G01F 23/2961 73/290 V |
| 2010/0018309 A1 | 1/2010 | Marcovecchio et al. | |
| 2010/0229539 A1* | 9/2010 | Timmons | F01N 3/2066 60/297 |
| 2012/0123706 A1* | 5/2012 | Armitage | G01F 23/292 702/55 |
| 2013/0025269 A1 | 1/2013 | Hodgson et al. | |
| 2013/0074590 A1 | 3/2013 | Bertow et al. | |
| 2013/0160433 A1* | 6/2013 | Schepers | G01F 23/00 60/295 |
| 2013/0263938 A1 | 10/2013 | Harr et al. | |
| 2014/0060177 A1* | 3/2014 | Kline | G01F 23/2962 73/290 V |
| 2014/0331650 A1* | 11/2014 | Yang | F01N 11/00 60/277 |
| 2014/0366512 A1* | 12/2014 | Hodgson | F01N 3/2066 60/286 |

FOREIGN PATENT DOCUMENTS

| | | | |
|---|---|---|---|
| DE | 102007016858 A1 | | 10/2008 |
| DE | 102007059853 A1 | | 6/2009 |
| DE | 102009000062 A1 | | 7/2010 |
| DE | 102009055716 A1 | | 6/2011 |
| DE | 102010014314 A1 | | 10/2011 |
| DE | 202011107567 U1 | | 11/2011 |
| DE | 102010024554 A1 | | 12/2011 |
| DE | 102010035008 A1 | | 2/2012 |
| DE | 102011089685 A1 | | 6/2013 |
| JP | 11153471 A | * | 6/1999 |
| JP | H11153471 A | | 6/1999 |
| JP | 2001208595 A | * | 8/2001 |
| JP | 2004340911 A | * | 12/2004 |
| JP | 2004347378 A | * | 12/2004 |
| WO | 2008101339 A1 | | 8/2008 |
| WO | 2009074428 A1 | | 6/2009 |
| WO | 2011064050 A1 | | 6/2011 |
| WO | 2011064266 A1 | | 6/2011 |
| WO | 2011085830 A1 | | 7/2011 |

* cited by examiner

DEVICE FOR SUPPLYING A LIQUID ADDITIVE AND MOTOR VEHICLE HAVING THE DEVICE

CROSS-REFERENCE TO RELATED APPLICATION

This is a continuation, under 35 U.S.C. §120, of copending International Application No. PCT/EP2013/056580, filed Mar. 27, 2013, which designated the United States; this application also claims the priority, under 35 U.S.C. §119, of German Patent Application DE 10 2012 007 691.6, filed Apr. 19, 2012; the prior applications are herewith incorporated by reference in their entirety.

BACKGROUND OF THE INVENTION

Field of the Invention

The invention relates to a device for supplying a liquid additive for a motor vehicle. The invention also relates to a motor vehicle having the device. In the automotive sector, liquid additives are required, for example, in exhaust-gas treatment devices.

For example, devices are known in which exhaust-gas purification methods are implemented, in such a way that the exhaust gases of an internal combustion engine are purified with the aid of a liquid additive. A particularly well-known exhaust-gas treatment method for which a liquid additive is required is the selective catalytic reduction [SCR] method. In that method, a reducing agent or a reducing agent precursor is supplied, (preferably) as a liquid additive, to an exhaust-gas treatment device. Through the use of the reducing agent, or through the use of the reducing agent precursor, a conversion of nitrogen oxide compounds is performed in the exhaust-gas treatment device. Ammonia is normally used as the reducing agent for that method. In the automotive sector, ammonia is normally not stored directly but, for example, in the form of a reducing agent precursor solution which can be supplied as liquid additive to the exhaust-gas treatment device. The reducing agent precursor solution is then converted, in the exhaust-gas treatment device, to form ammonia (the reducing agent itself). A urea-water solution is used, for example, as the reducing agent precursor solution. A 32.5% urea-water solution is available under the trade name AdBlue® for exhaust-gas purification.

In order to supply a urea-water solution of that type or a reducing agent of that type in motor vehicles, a supply device is provided which has a tank for storing the liquid additive and a delivery unit for delivering the liquid additive. Furthermore, an injector or similar metering apparatus is typically provided, with which the liquid additive can be fed to the exhaust-gas treatment apparatus. The delivery unit is then constructed for delivering the liquid additive out of the tank to the injector. In order to determine the amount of liquid additive stored in the tank, a fill level sensor is generally provided, with which the fill level of the liquid additive in the tank can be monitored.

It is known to use an ultrasound sensor which can emit sound waves, as a fill level sensor. The sound waves are reflected on a liquid surface of the liquid additive in the tank and directed back to the ultrasound sensor, which receives the reflected waves. It is possible to determine the distance between the liquid surface of the liquid additive in the tank and the ultrasound sensor by way of a propagation time measurement of the sound waves. The distance to the liquid surface can be used as information regarding the fill level in the tank.

It is particularly advantageous for the path of the sound waves to be restricted or predefined by using a pipe or a duct filled with the liquid additive, for example in order to obtain a precise orientation of the sound waves toward the liquid surface of the liquid additive. It is, however, a problem in that case that (solid) deposits often form in a tank for a liquid additive. If the liquid additive is urea-water solution, it is for example possible for such deposits to form, as a result of conversion processes, from the urea-water solution itself. The deposits may also be formed of impurities which have passed into the tank during the filling and/or replenishment of the tank with liquid additive. If a pipe or a duct is provided for orientation of the sound waves, such deposits particularly commonly form in the duct.

SUMMARY OF THE INVENTION

It is accordingly an object of the invention to provide a device for supplying a liquid additive and a motor vehicle having the device, which overcome the hereinafore-mentioned disadvantages and solve, or at least lessen, the highlighted technical problems of the heretofore-known devices and vehicles of this general type. It is sought, in particular, to propose an especially advantageous device for supplying a liquid additive. In this case, the device should, in particular, have a technically simple and robust construction for precise, long-term use in a motor vehicle.

With the foregoing and other objects in view there is provided, in accordance with the invention, a device for supplying a liquid additive for a motor vehicle, comprising a tank for storing the liquid additive, a delivery unit for delivering the liquid additive out of the tank, and a sensor which emits and receives waves and is constructed to measure the fill level of the liquid additive in the tank by way of a propagation time measurement of the waves along a measurement path to a liquid surface in the tank and back to the sensor. The measurement path runs at least partially through a measurement duct and at least one back-flushing line ends in the measurement duct in such a way that flushing of the measurement duct to the tank can be performed.

This concept makes it possible, with simple technical measures, to realize cleaning of the measurement duct in accordance with requirements.

The device for supplying the liquid additive includes not only the tank and the delivery unit but preferably also an injector or the like with which the liquid additive can be fed to an exhaust-gas treatment device. The injector may, in particular, include a dosing valve and/or an injection point. In this case, therefore, the expression "injector" is used as an all-encompassing term for all conceivable (actively actuable and/or passively operating) devices for dispensing and feeding liquid additive into an exhaust-gas treatment device. The injector is preferably connected to the delivery unit and to the tank through a line. The liquid additive can be delivered to the injector through the line.

The delivery unit preferably has a pump for delivering the liquid additive. Dosing of the liquid additive into the exhaust-gas treatment device (that is to say the most exact possible metering of a predefined amount or of a predefined mass flow of the liquid additive into the exhaust-gas treatment device) can be performed by the delivery unit and/or by the injector. If the delivery unit performs the dosing, the delivery unit preferably has a dosing pump with which the delivered amount of liquid additive can be precisely set. If the dosing is performed by using the injector, the injector preferably has an actively controllable dosing valve. The delivery unit then preferably has a pump with which the liquid additive can be supplied to the injector at a predefined pressure. It is then possible for the amount of liquid additive fed to an exhaust-gas treatment device to be precisely set by using the opening time of the dosing valve in the injector.

The sensor is preferably an ultrasound sensor which emits and receives ultrasound waves. For this purpose, the sensor preferably has a transmitter unit, which emits the ultrasound waves, and a receiving unit, which receives the ultrasound waves. Where reference is made hereinafter to "waves," this refers, in particular, to ultrasound waves.

The measurement path, in particular a position and an orientation of the measurement path, are preferably predefined by the orientation of the sensor. The sensor typically emits waves in a particular direction. The measurement path extends from the sensor along the ultrasound waves emitted by the sensor. The measurement path is thus predefined by the orientation of the sensor. The expression "measurement path" refers to the path followed by the waves emitted by the sensor to the liquid surface and back to the sensor again from the liquid surface.

In order to protect the measurement path and assist the propagation of the emitted (and reflected) waves along the measurement path, the measurement path in this case runs through a measurement duct. In this case, waves which are emitted by the sensor and which would depart from the measurement path (for example due to scatter and/or reflections) are reflected back into the measurement path by a wall of the measurement duct. The sensor is preferably disposed directly on/in the measurement duct, in such a way that the measurement path from the sensor runs initially through the measurement duct. At a (first) duct end (situated opposite the sensor) of the measurement duct, the measurement path then exits the measurement duct and runs through the tank to a liquid surface. In this case, the measurement path and the measurement duct are filled with additive in accordance with the fill level of the liquid additive in the tank.

The liquid surface constitutes the liquid level formed by the liquid additive in the tank, and for this reason, is representative of the fill level of the liquid additive in the tank.

The back-flushing line ends in or leads into the measurement duct preferably in the direct vicinity of the sensor (and preferably at another duct end of the measurement duct, at which the sensor is also disposed). It is accordingly possible, during a flushing process, for the measurement duct to be flushed through practically completely from the back-flushing line to the (first or opposite) duct end. The back-flushing line preferably ends in or leads into the measurement duct in such a way that the flushing medium introduced thereby can flow over the entire distance from the sensor to the (first or opposite) duct end. By flushing the measurement duct, deposits that have formed in the measurement duct can be flushed back into the tank.

The measurement duct is preferably situated at a small distance from a bottom of the tank. In this way, the duct can be completely filled with liquid additive even when there is a low fill level of liquid additive in the tank, and thus a measurement of the fill level can be performed by using the sensor even in the presence of a low fill level. The duct is preferably disposed at a distance of less than 15 cm, particularly preferably less than 10 cm, from the bottom of the tank. This means, in particular, that all points of the measurement duct are at such a distance from an (imaginary) bottom plane of the tank.

In a further advantageous embodiment of the device, a reference surface which is situated within the measurement duct is disposed in such a way that a part of the waves emitted by the sensor is reflected and passes back to the sensor. The part of the waves thus does not pass to the liquid surface, but is instead reflected back to the sensor by the reference surface before it can do so. It is thus possible to perform a reference propagation time measurement of the waves in the liquid additive. The reference propagation time measurement can be used as a reference propagation time measurement for the propagation time measurement used for the fill level determination. On the other hand, the propagation time measurement can be used for determining the quality of the liquid additive. If the liquid additive is urea-water solution, the propagation speed of the waves from the sensor in the liquid additive is at least partially dependent on the concentration of the urea-water solution. Accordingly, by using a propagation time measurement to a reference surface and back to the sensor, it is possible to determine the concentration of the liquid additive.

The flushing of the measurement duct through the back-flushing line may, for example, be performed with liquid additive as a fluid. It is, however, also possible for a further fluid to be used for flushing the duct. For example, air which is introduced into the measurement duct through the back-flushing line may be used as a flushing fluid. The air that is introduced then passes into the tank during the flushing process, and rises there in the form of air bubbles. The air therefore does not have a disruptive effect in the tank.

In accordance with another advantageous feature of the device of the invention, the back-flushing line is connected to the delivery unit and, for the flushing of the measurement duct, permits a circulation of liquid additive through the delivery unit, through the back-flushing line and through the measurement duct back into the tank.

In the case of a device of this type, the measurement duct can be flushed with the aid of liquid additive as a flushing medium. This is particularly advantageous because few additional components need to be provided for carrying out the flushing process. This is advantageous, in particular, in relation to flushing with air, which is basically also possible. Furthermore, delivery units for a liquid additive commonly have a back-flushing line, through which circulation of liquid additive is possible, in any case. The back-flushing lines serve, for example, for conveying air bubbles out of the delivery unit and/or for (partially) evacuating the delivery unit. In the case of the described device, the back-flushing line may additionally be used for the cleaning of the measurement duct. This is a particularly advantageous synergetic effect.

In order to provide for the circulation, the delivery unit preferably has a branching point in a delivery duct downstream of the delivery pump as viewed in the delivery direction. The back-flushing line branches off from an outlet line (which runs from the pump in the direction of the injector) at the branching point. It is preferable for a return valve, with which the back-flushing line can be actively opened and closed, to be disposed on the back-flushing line. When the return valve is open, a flushing process or circulation is performed. When the return valve is closed, the delivery unit performs normal delivery of liquid additive to the injector.

A device of this type for providing liquid additive permits flushing of the measurement duct and simultaneously has a particularly inexpensive and simple construction.

In accordance with a further advantageous feature of the device of the invention, the back-flushing line is connected directly to the tank, in such a way that movements of the liquid additive in the tank result in flushing of the measurement duct through the back-flushing line.

In the case of this construction of the device, too, flushing of the measurement duct is performed with the aid of the liquid additive. In this case, sloshing movements of the liquid additive assist the flushing of the measurement duct. Sloshing movements of the liquid additive in the tank arise, for example, while a motor vehicle is traveling, due to acceleration or cornering maneuvers. In the case of this embodiment, the measurement duct preferably forms, together with the back-flushing line, a continuous duct section which is connected at both sides to the tank. In this case, the configuration is preferably such that, during the movement of the liquid additive in the tank, the preferred flow direction corresponds to the transmitting direction of the sensor. This may be achieved by using a corresponding position, and/or by using flow resistances in the region of the duct section. Deposits are flushed out of the duct in this way.

It is basically also possible for both of the above-mentioned variants to be combined. A situation may also be realized in which, with the back-flushing line connected to the delivery unit, active flushing (in a first flushing direction) that can be triggered in a targeted fashion, and/or (otherwise) passive flushing (in another flushing direction if desired), can be performed by using the back-flushing line connected (directly) to the tank.

In accordance with an added advantageous feature of the device of the invention, the measurement duct has at least one first duct end which is connected to the tank and the back-flushing line has a second duct end which is connected to the tank, wherein the first duct end and the second duct end lead to the tank at the same geodetic height.

It is particularly preferable for the tank to have a respective depression in the region of the first duct end and of the second duct end (that is to say where the duct ends issue directly into the tank). In this way, during the flushing of the measurement duct due to sloshing movements of the additive in the tank, deposits can collect in each of the depressions and do not pass back into the measurement duct. The configuration at the same geodetic height means that, when the device is oriented in a predefined installation position, the two duct ends are disposed at the same height. In this way, in the event of sloshing movements, the liquid additive can enter the back-flushing line and flushes the measurement duct without problems and without it being necessary for a high flow resistance to be overcome. The measurement duct and the back-flushing line preferably have a planar base surface without recesses and projections. In this way, it is possible to prevent deposits from becoming stuck in the duct itself. Even slight sloshing movements can then lead to flushing of the measurement duct sufficient to convey deposits out of the latter.

In accordance with an additional advantageous feature of the device of the invention, a diverting device which is provided in the measurement path is suitable for diverting waves emitted by the sensor out of the measurement duct and toward the liquid surface.

It has already been explained further above that the measurement duct preferably runs at a small distance (for example less than 15 cm) from the bottom of the tank. In this case, the measurement duct is preferably disposed so as to be inclined with respect to the bottom of the tank, or with respect to a plane formed by the bottom of the tank, at a shallow angle, for example, of at most 10° and particularly preferably at most 5°. In order to be able to measure the fill level of the liquid additive in the tank in a particularly advantageous manner, it is advantageous for the transmitted waves to impinge as far as possible perpendicularly on the liquid surface in the tank. It is therefore advantageous for a diverting device to be provided between that region of the measurement path which runs through the measurement duct and that region of the measurement path which runs to the liquid surface. A diverting device or diverter of this type may be formed, for example, by an oblique surface and/or a prism.

In accordance with yet another advantageous feature of the device of the invention, the measurement duct runs parallel to the liquid surface. It can thus be achieved that the measurement duct is completely filled with liquid additive even in the presence of a particularly low fill level. In particular if a reference surface is provided in the measurement path and/or in the measurement duct (as described further above), it can thus be achieved that the reference surface is covered, and a particularly efficient reference measurement can be performed, even in the presence of low fill levels.

It is preferable for a diverting device for diverting the waves to be disposed directly downstream of the measurement duct (at the first duct end) as viewed in a propagation direction of the waves along the measurement path. This makes it possible to realize a particularly compact construction of the measurement path and of the diverting device for diverting the waves to the liquid surface.

In accordance with yet a further advantageous feature of the device of the invention, the delivery unit has a housing which includes the sensor and the measurement duct, and the housing is disposed on the bottom of the tank.

The tank preferably has, on or in the bottom, an opening into which the delivery unit with the measurement duct and the sensor is integrated as a compact functional unit, in such a way that the delivery unit extends into an interior of the tank proceeding from the bottom of the tank. For this purpose, on the opening in the bottom of the tank and/or on the housing of the delivery unit, there may be disposed a flange and/or a fastener (for example an SAE fastener) with which the housing of the delivery unit or the delivery unit is inserted in fluid-tight and mechanically secure fashion into the tank.

In accordance with yet an added advantageous feature of the device of the invention, the housing has an indentation into which the measurement duct issues or leads, by way of a first duct end, into the tank.

The housing is preferably circular or has a cylindrical basic form in order to ensure that it can be inserted in the tank bottom with particularly good sealing action and orientation in a technically simple manner. The indentation constitutes a deviation (directed at least partially toward the center) from the cylindrical basic form, which decreases the internal volume of the housing and increases the internal volume, which is filled with liquid additive, of the tank surrounding the housing. If the housing has an indentation in which the measurement duct issues, by way of a first duct end, into the tank, it is for example possible for a diverting device for diverting the waves along the measurement path to be disposed within the indentation. It is accordingly possible for the functional unit formed by the delivery unit and the housing and the sensor to have a particularly compact form and be provided independently of the tank. In particular, it is advantageous if the diverting device is disposed within the (imaginary or closed) cylindrical basic form. Installation of the housing and of the delivery unit in the tank can be simplified in this way.

In accordance with yet an additional advantageous feature of the device of the invention, the housing is at least partially surrounded by a filter through which the delivery unit extracts the liquid additive from the tank, but the filter does not cover the measurement duct.

In particular, the measurement duct is freely accessible for the liquid additive from the tank. Liquid additive that flows from the tank into and/or out of the measurement duct is, in particular, not filtered, or does not pass through the filter. The filter preferably has at least one fastening device with which the filter can be fixedly installed on the housing. The filter generally constitutes a flow resistance for the liquid additive, which impedes or slows the equalization of the fill levels upstream of the filter (in the tank) and downstream of the filter (in the region in which the liquid additive has already been filtered). Due to the free access to the measurement duct for the liquid additive, it can be ensured that the fill level can be determined in a particularly precise manner by using the sensor which is disposed in the measurement duct.

With the objects of the invention in view, there is concomitantly provided a motor vehicle, comprising an internal combustion engine, an exhaust-gas treatment device for the purification of the exhaust gases of the internal combustion engine, and a device according to the invention as described for feeding a liquid additive to the exhaust-gas treatment device.

It is preferably possible for the method of selective catalytic reduction to be performed in the exhaust-gas treatment device, in which case the liquid additive that is fed by using the device is preferably reducing agent or reducing agent precursor solution for the SCR method.

It is clear that numerous modifications will emerge to a person skilled in the art from the description above and the description that follows. These may relate, for example, to the number of sensors, measurement ducts, flushing systems, diverting device, etc.

Other features which are considered as characteristic for the invention are set forth in the appended claims, noting that the features specified individually in the claims may be combined with one another in any desired technologically meaningful way and may be supplemented by explanatory facts from the description, with further embodiments of the invention being specified.

Although the invention is illustrated and described herein as embodied in a device for supplying a liquid additive and a motor vehicle having the device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL
VIEWS OF THE DRAWING

DETAILED DESCRIPTION OF THE
INVENTION

Figure 1:
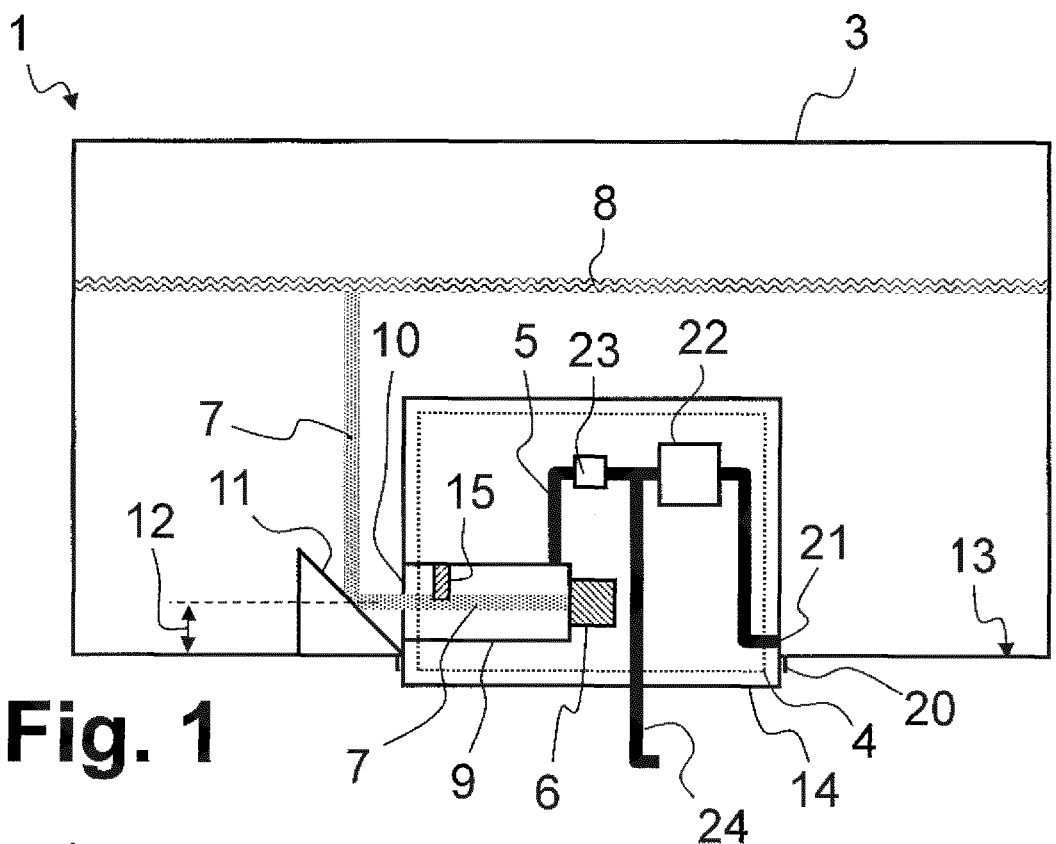
FIG. 1 is a longitudinal-sectional view of a tank having a device for supplying a liquid additive as described herein.

Referring now in detail to the figures of the drawings which, along with their illustrated proportions, are merely diagrammatic, and first, particularly, to FIG. 1 thereof, there is seen a device 1 which has a tank 3 and a delivery unit 4. The delivery unit 4 is inserted through an opening 20 into a bottom 13 of the tank 3, in such a way that the delivery unit 4 or a housing 14 of the delivery unit 4 extends from the bottom 13 of the tank 3 into an interior of the tank 3, which can be filled with liquid additive. The delivery unit 4 has a pump 22 with which liquid additive can be extracted from the tank 3 at an intake point 21. The liquid additive delivered by the pump 22 can be supplied through an outlet line 24 to an injector (for example on an exhaust-gas treatment device). It is furthermore possible for liquid additive that has been delivered by the pump 22 to be delivered through a back-flushing line 5 into a measurement duct 9. The delivery of the liquid additive through the back-flushing line 5 can be controlled by using a return valve 23. The back-flushing line 5 branches off from the outlet line 24.

The device 1 has a sensor 6, which is preferably an ultrasound sensor. The sensor 6 is disposed on the measurement duct 9. A propagation time measurement for waves from the sensor 6 to a liquid surface 8 of the liquid additive in the tank 3 and back to the sensor 6 can be performed with a measurement path 7 extending from the sensor 6. Through the use of the propagation time measurement, it is possible to determine the fill level of the liquid additive in the tank 3. The measurement path 7 extends from the sensor 6 initially through the measurement duct 9, which can be flushed with the aid of the back-flushing line 5. Downstream of the measurement duct 9, the measurement path 7 is diverted at a diverting device or diverter 11, in such a way that the measurement path impinges perpendicularly (from below) on the liquid surface 8 of the liquid additive in the tank 3. At the liquid surface 8, the waves are (partially) reflected in order to then be diverted by the diverting device 11 back through the measurement duct 9 to the sensor 6 again. A reference surface 15, which is situated in the measurement duct 9, reflects a part of the waves emitted by the sensor 6, in such a way that the waves pass directly back to the sensor 6. It is possible to perform a reference propagation time measurement by measuring the propagation time from the sensor 6 to the reference surface 15 and back. The reference propagation time measurement can be used firstly for offsetting against the propagation time measurement to the liquid surface 8, and for thereby determining the distance between the liquid surface 8 and the sensor 6 along the measurement path 7. Furthermore, the reference measurement can be used for performing a quality measurement on the liquid additive in the tank 3.

Figure 2:
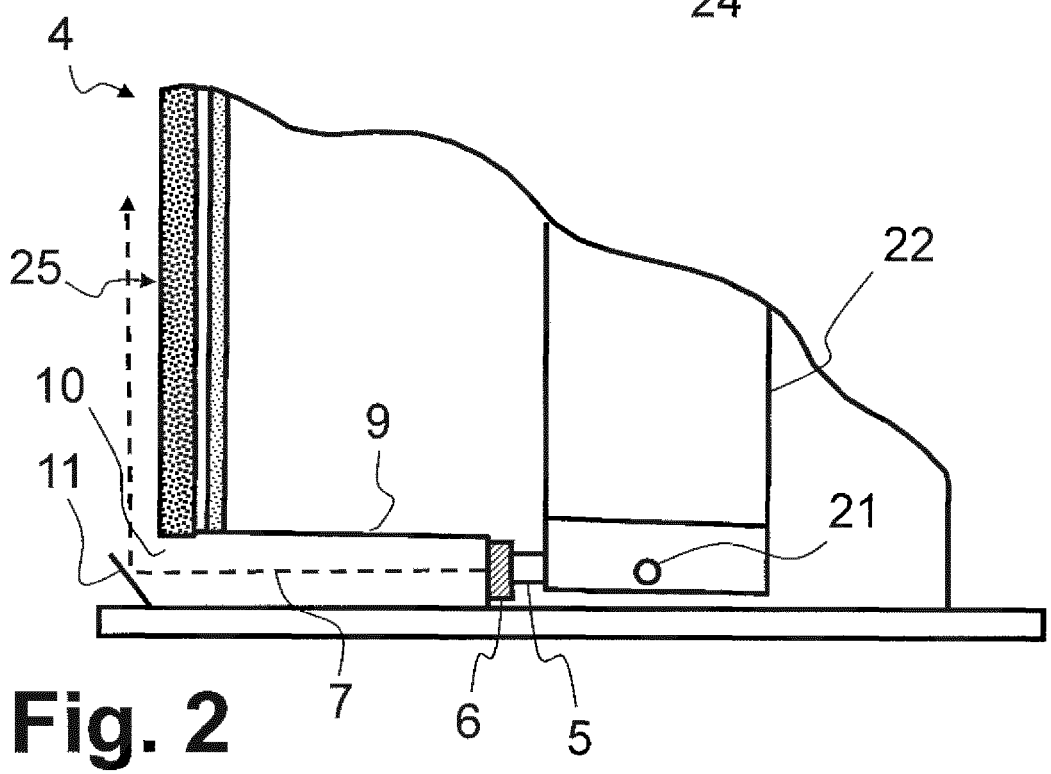
FIG. 2 is an enlarged, fragmentary, sectional view of a delivery unit for the device.

The illustration in FIG. 2 shows a detail of a delivery unit 4 for a device as described herein. The detail likewise shows the measurement duct 9 which is adjoined by the sensor 6 and into which the back-flushing line 5 issues. The back-flushing line 5 is connected to the pump 22 in order to ensure that flushing of the measurement duct 9 can be performed as required. Also shown is the intake point 21 at which the pump 22 extracts the liquid additive from the tank. Additionally shown is a filter 25 which surrounds practically the entire delivery unit 4 and which thus also jointly covers the intake point 21. The measurement path 7, along which the sensor 6 emits and receives waves, runs from the sensor through the measurement duct 9 to a diverting device or diverter 11. The measurement path 7 is diverted at the diverting device 11 (where the measurement path 7 exits the duct 9 at a first duct end 10), toward a liquid surface of the liquid additive in the tank.

Figure 3:
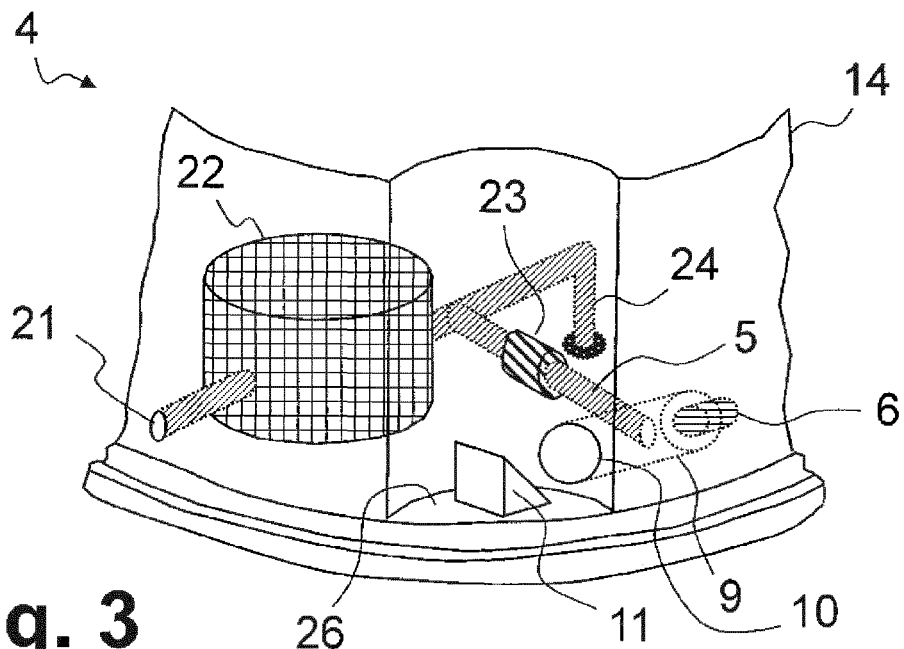
FIG. 3 is a fragmentary, perspective view of a delivery unit for the device.

FIG. 3 is a perspective illustration of a delivery unit 4 for the device as described herein. Also shown therein is the pump 22 which extracts liquid additive from the tank at the intake point 21 and delivers the liquid additive to an outlet line 24. The back-flushing line 5 branches off from the outlet line 24. The back-flushing line can be opened and closed in a targeted manner by using a return valve 23 in order to control flushing of the measurement duct 9 through the back-flushing line 5. The measurement duct 9 ends at a first duct end 10 in the tank. The first duct end 10 is disposed at an indentation 26 of the delivery unit 4 or of the housing 14 of the delivery unit 4. Waves which are transmitted by the sensor 6, and which have passed through the measurement duct and exited the latter through the first duct end 10, are reflected toward a liquid surface on a diverting device or diverter 11 in the indentation.

Figure 4:
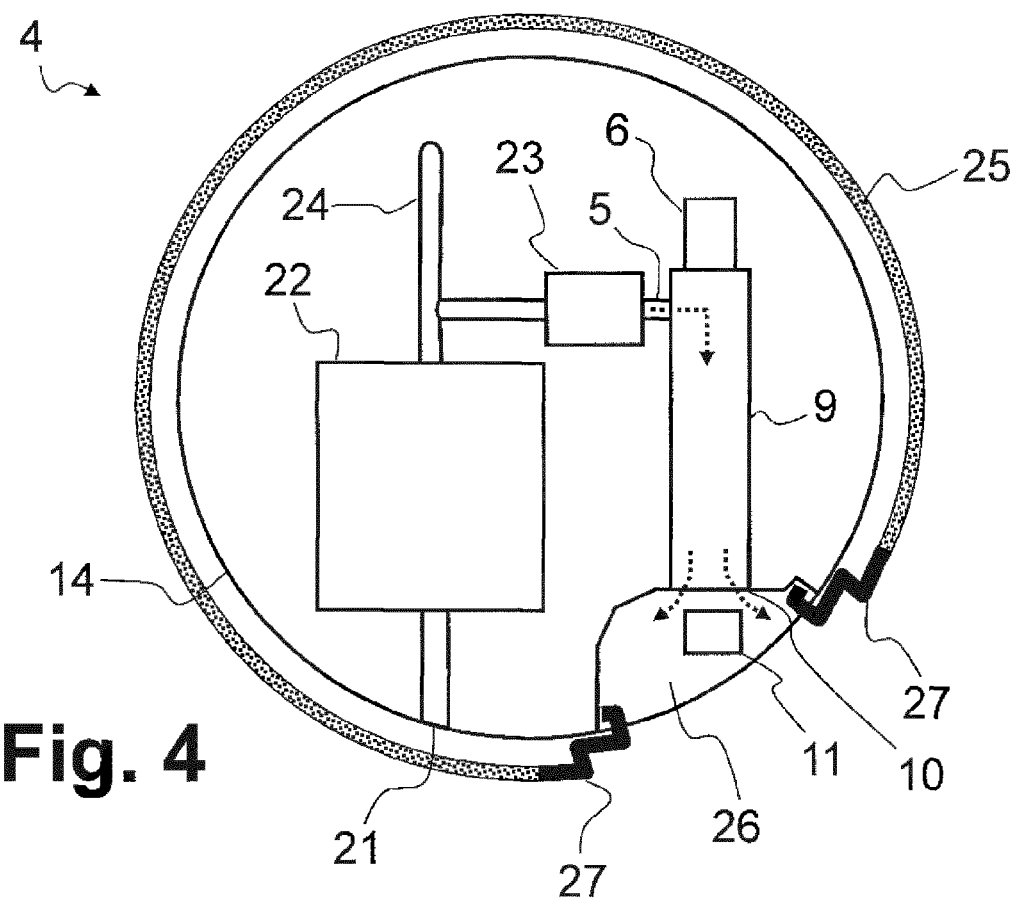
FIG. 4 is a cross-sectional view showing a first embodiment of a delivery unit for the device from above.
Figure 5:
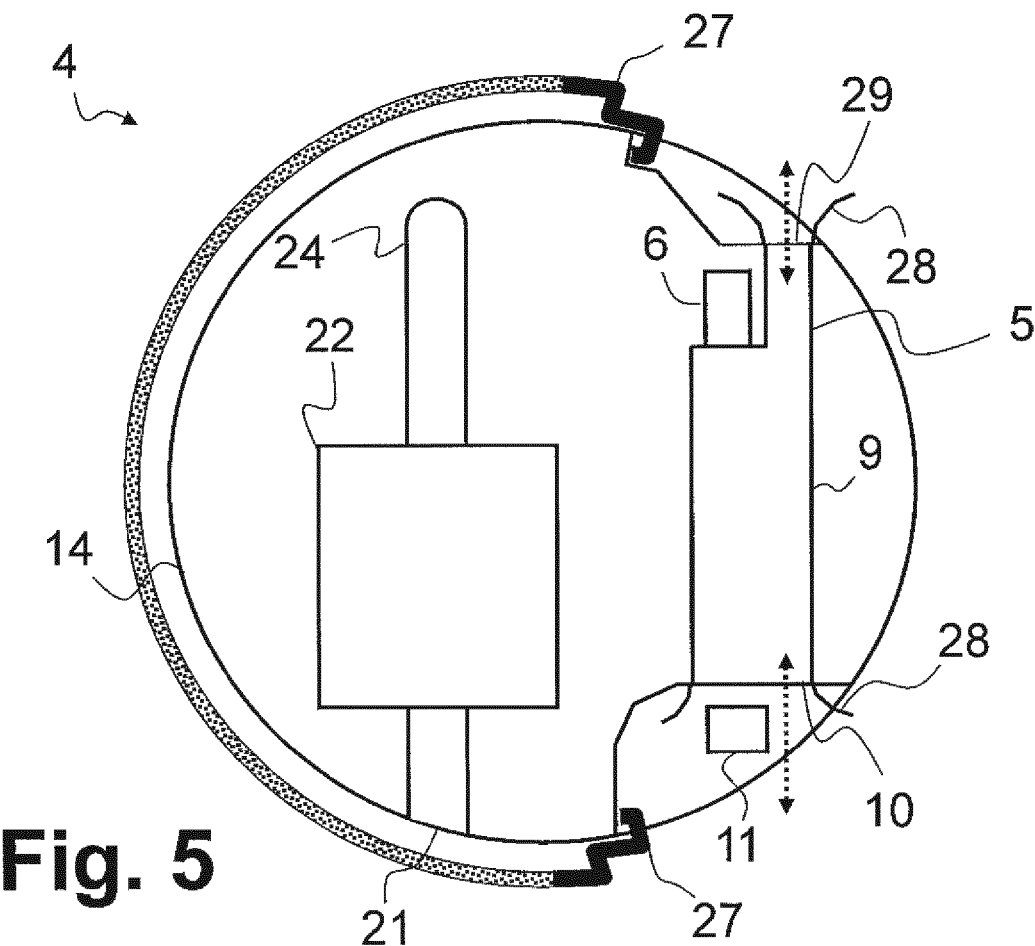
FIG. 5 is a cross-sectional view showing a second embodiment of a delivery unit for the device from above.

FIG. 4 and FIG. 5 show two different embodiments of a delivery unit 4 for the device, each of which is shown in a sectional view from above. The embodiment illustrated in FIG. 4 corresponds substantially to the embodiment illustrated in FIG. 1, 2 or 3. The features which FIGS. 4 and 5 have in common will firstly be explained jointly herein.

FIGS. 4 and 5 each show a delivery unit 4 having a cylindrical housing 14 which is cut into and partially surrounded by a filter 25. The measurement duct 9 with the sensor 6 issues by way of the first duct end 10 into the non-illustrated tank, or into an interior of the tank, which can be filled with liquid additive, in each case at an indentation 26. The filter 25 has in each case fastening devices or fasteners 27 with which the filter 25 can be fastened to the housing 14 of the delivery unit 4 in such a way that the measurement duct 9 is not separated from the interior of the tank by the filter 25. There is preferably a free flow path from the measurement duct 9 into an interior of a tank for liquid additive. In the embodiments according to FIGS. 4 and 5, an intake point 21 for the intake of liquid additive from the non-illustrated tank by way of a pump 22 is disposed in each case so as to be covered by the filter 25. The liquid additive taken in by the pump 22 is thus taken in through the filter 25, and filtered or purified in the process. In particular, impurities in the liquid additive should not pass into the pump 22. In the embodiments according to FIGS. 4 and 5, the pump 22 makes the liquid additive available in each case at an outlet line 24. In both embodiments, the sensor 6 is disposed at an end of the measurement duct 9 situated opposite the duct end 10. The diverting device or diverter 11 is disposed at the duct end 10 in order to divert waves, which are emitted by the sensor 6 through the measurement duct along the non-illustrated measurement path, upward to a liquid surface. In both embodiments, the measurement path that is not shown therein runs correspondingly to that shown in FIGS. 1 and 2.

In FIG. 4, the back-flushing line 5 branches off from the outlet line 24. A return valve 23 is situated in the back-flushing line 5. The back-flushing of the measurement duct 9 can be controlled with the return valve 23. Flushing of the measurement duct 9 is indicated by arrows.

In the embodiment according to FIG. 5, the back-flushing line 5 connects the measurement duct 9 to the tank. The back-flushing line 5 preferably issues (directly) into the tank at a second duct end 29. Flushing of the measurement duct 9 by using the back-flushing line is indicated in each case by arrows, which illustrate the flow of the liquid additive. In FIG. 5, respective inflow devices 28 are disposed at each of the first duct end 10 and the second duct end 29. The inflow devices facilitate an inflow of the liquid additive into the back-flushing line 5 when sloshing movements of the liquid additive occur in the tank.

Figure 6:
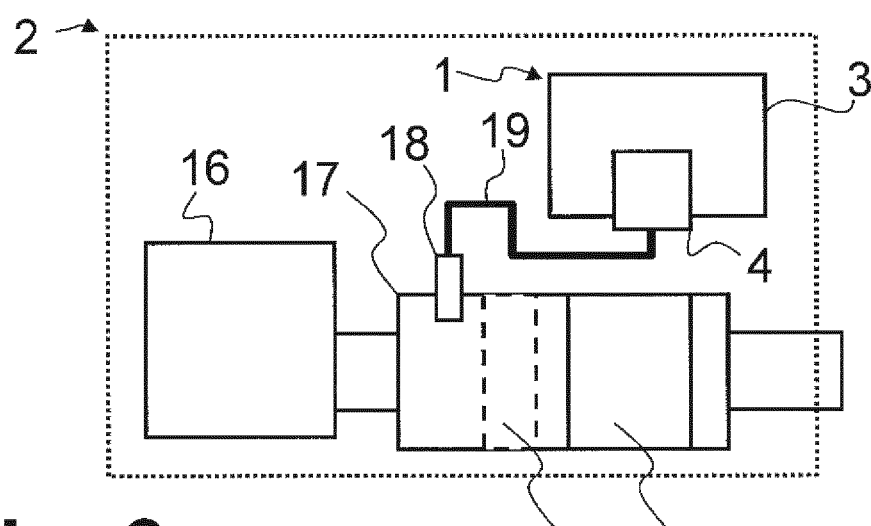
FIG. 6 is a block diagram of a motor vehicle having the device.

FIG. 6 shows a motor vehicle 2 having an internal combustion engine 16 and an exhaust-gas treatment device 17 for the purification of exhaust gases of the internal combustion engine 16. The method of selective catalytic reduction, for example, can be performed in the exhaust-gas treatment device 17, for which purpose the exhaust-gas treatment device 17 can be supplied with liquid additive, in particular reducing agent and particularly preferably aqueous urea solution, through an injector 18. A reducing agent of that type is, in particular, metered in upstream of an SCR catalytic converter 30, and it is also possible for at least one further exhaust-gas treatment unit 31 (mixer, catalytic converter, particle separator, etc.) to be positioned between the injector 18 and the SCR catalytic converter 30. The injector 18 is supplied with liquid additive by a device 1 through a line 19. The device 1 includes a tank 3 and a delivery unit 4.

The device described herein is particularly advantageous because, due to the flushing, contamination of the measurement duct can be prevented, and thus the measurement of the fill level in the tank for liquid additive can be performed with particularly high accuracy.

The invention claimed is:

1. A device for supplying a liquid additive for a motor vehicle, the device comprising:
   a tank configured to store the liquid additive having a fill level and a liquid surface in said tank;
   a delivery unit having a pump for extracting the liquid additive out of said tank, said delivery unit having a housing containing said pump;
   a measurement duct associated with said delivery unit, said measurement duct having a first duct end leading into said tank through said housing;
   a sensor associated with said delivery unit and configured to emit and receive waves;
   a measurement path running between said sensor and said liquid surface and at least partially through said measurement duct;
   said sensor configured to measure said fill level of the liquid additive in said tank by using a propagation time measurement of the waves along said measurement path from said sensor to said liquid surface in the tank and back to said sensor; and
   at least one back-flushing line leading into said measurement duct and configured to perform flushing of said measurement duct to said tank, said back-flushing line issuing into said tank at a second duct end opposite said first duct end.

2. The device according to claim 1, wherein said at least one back-flushing line is connected to said delivery unit and flushes said measurement duct by permitting a circulation of liquid additive through said delivery unit, through said at least one back-flushing line and through said measurement duct back into said tank.

3. The device according to claim 1, wherein said at least one back-flushing line is connected directly to said tank and causes movements of the liquid additive in said tank resulting in flushing of said measurement duct through said at least one back-flushing line.

4. The device according to claim 3, wherein said first duct end and said second duct end issue into said tank at the a same geodetic height.

5. The device according to claim 1, which further comprises a diverter disposed in said measurement path and configured to divert waves emitted by said sensor out of said measurement duct and toward said liquid surface.

6. The device according to claim 1, wherein said measurement duct runs parallel to said liquid surface.

7. The device according to claim 1, wherein said tank has a bottom, said housing is disposed on said bottom and includes said sensor and said measurement duct.

8. The device according to claim 7, wherein said housing has an indentation, said first duct end leads into said tank at said indentation.

9. The device according to claim 7, which further comprises a filter at least partially surrounding said housing but not covering said measurement duct, said delivery unit extracting the liquid additive from said tank through said filter.

10. A motor vehicle, comprising:
an internal combustion engine;
an exhaust-gas treatment device configured to purify exhaust gases of said internal combustion engine; and
a device according to claim 1 configured to feed a liquid additive to said exhaust-gas treatment device.

11. The device according to claim 1, wherein said pump is fluidically connected to said back-flushing line to supply liquid additive to said measurement duct.

12. The device according to claim 11, wherein said pump is connected to said back-flushing line with a return valve.

13. The device according to claim 1, wherein said first duct end and said second duct end are flared to facilitate an inflow of liquid additive into said measurement duct when sloshing movements of the liquid additive occur in the tank.

* * * * *